UNITED STATES PATENT OFFICE.

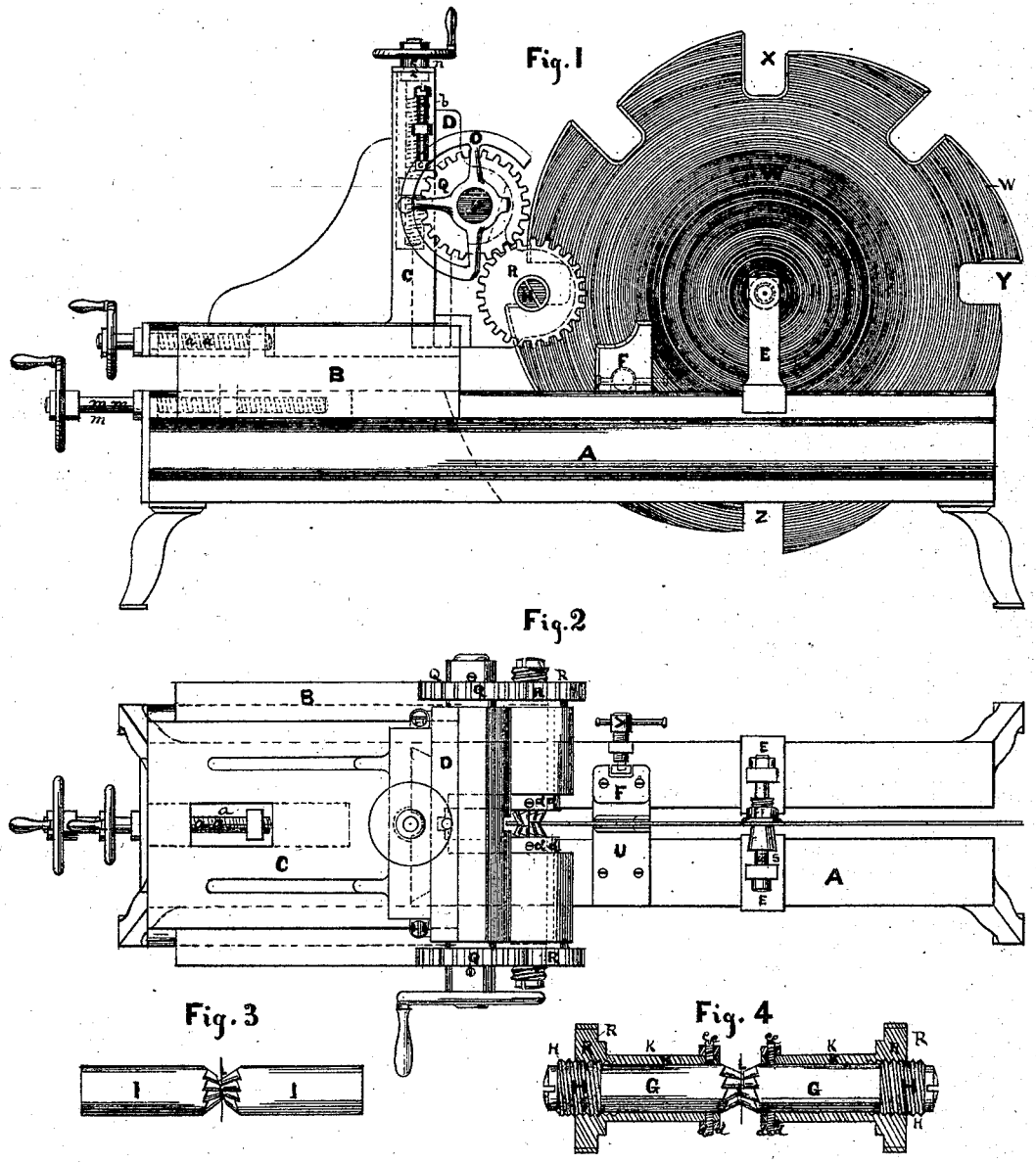

WILLIAM HAWKINS, OF SAN FRANCISCO, CALIFORNIA.

IMPROVEMENT IN MILLING-MACHINES.

Specification forming part of Letters Patent No. 120,433, dated October 31, 1871.

*To all whom it may concern:*

Be it known that I, WILLIAM HAWKINS, of San Francisco city, in the county of San Francisco and State of California, have invented certain Improvements in Milling-Machines; and I do hereby declare that the following is a full, clear, and exact description of the same, reference being had to the accompanying drawing making a part of this specification, in which—

Figure 1 is a side elevation. Fig. 2 is a plan. Fig. 3 is a section of cutters. Fig. 4 is a section of journals, sleeves, and cutters, showing the screw at end of boxes and collars of my device.

To enable others skilled in the manufacture and use of milling-machines, I will proceed to describe its construction and operation.

When recesses or sockets in saws are required in straight or circular forms this machine is designed for cutting V's in circular-saw plates, wherein detached or removable teeth are used. The cutters are so formed and arranged as to cut both surfaces of the V at the same time.

In all milling-machines heretofore used for milling or cutting a V on saw-plates or hardened steel plates the milling has been done on one side at a time, thus rendering the process very slow, and difficulty has existed in getting the V in the center of a thin plate on account of its varying in thickness. Circular-saw plates when well formed or made are always thicker in the center than they are on the rim, thus leaving that part to be milled or V'd tapering or varying in thickness.

Now, my invention has for its object the remedying of these difficulties by cutting the V on both sides at one and the same time to any desired shape or bevel, and to any desired form, by using two cutters—one opposite the other—so shaped as to give the required shape, pitch, or bevel to the V to be cut; and the cutters recessed into or lapped by each other at the inner or cutting-ends, as shown by L, Figs. 3 and 4, or in such a manner as to remove all surplus metal in the center of the V, making a clean smooth cut, and leaving a perfect V or other shape, as desired, at one operation. My cutters are constructed so as to give the exact circle at the corners of the socket required. They are easily detached, and ground or sharpened without affecting the temper, and by grinding or removing the same amount of material from their ends as their sides their exact diameter at the cut can always be preserved.

A is a machine frame, which should be substantially constructed of iron or other suitable metal to resist the pressure of the cutters. B is a movable head, well fitted to the frame A, and moved by means of screws $m\,m$ to give the length of cut on lower side of socket; likewise to give position to movable head C, which enters and is secured in B. Head C gives the length of cut on upper side of the socket, and is moved by screw $a\,a$. D is a movable head, well fitted to head C, and moved by means of screw $n\,n$, and shaped as shown in the drawing, and is to give the up motion and straight cut on the bottom of the socket or recess in the circular form to the socket, given and determined by the diameter of the cutters. G, Fig. 4, are the cutters in their position, showing the lap or intersection at L. I, Fig. 3, shows two cutters in position, with another form of lap, as shown at L. K K, Fig. 4, are sections of sleeves or hollow tubes, which serve as journals to carry the cutters G, and into which my cutters are placed, adjusted, and operated. $b\,b$, Fig. 1, is an adjustable screw passing through a nut attached to head C, and is so adjusted as to determine the width of the socket to be cut. $c\,c$, Fig. 1, is a lug or stop attached to head D, and comes against the screw $b\,b$ when cutting or forming the upper side of the socket. O, Fig. 1, is a hand or band-wheel, attached to shaft P and gear-wheel Q, and gives motion to gear-wheel R attached to sleeves K, which gives motion to cutters G, Figs. 1, 2, and 4, and are securely fastened to sleeves or tubes K, as shown in Fig. 4, which carries the cutters G, that are securely fastened in sleeves or tubes K, Fig. 4, which are attached and revolve in movable head D, Figs. 1 and 2. H, Figs. 1, 2, and 4, are adjustable screws, for the purpose of adjusting the cutters G and preventing any endwise motion, holding them firmly in position when cutting. $d\,d$, Figs. 2 and 4, are collars, securely fastened to or made a part of the tubes or sleeves K K, to rest against the shoulder of boxes, Fig. 2, and to resist the endwise tendency of the cutters G from spreading apart while cutting. $e\,e$, Fig. 4, are set-screws, passing through collar $d\,d$, resting against cutters G, and holds them fast or secure in sleeves or tubes K. E, Figs. 1 and 2, are adjustable stands attached to frame A. S, Fig. 2, is a spindle supported by stand E. J, Fig. 2, is a cone or taper sleeve made to fit the different sizes of eyes in saws, and revolves and slides on spindle S for the purpose of centering the saw and keeping it in any desired position. T, Fig. 2, is a nut and collar, fitted to cone-sleeves J to hold the saw firm onto the cone J. F, Fig. 2, is an adjustable jaw, which holds the saw firm to rest U by means of screw V, while it is being operated by cutters G. W, Fig. 1, is a saw-plate, showing the recesses or sockets; it is in the machine. X, Fig. 1, shows a socket when finished. Y, Fig. 1, shows section of socket partly V'd. Z, Fig. 1, is a socket before being operated upon by the cutters.

What I claim, and desire to secure by Letters Patent, is—

1. The sleeves or tubes K when made as described, in combination with the cutters G and screws H, as and for the purpose herein set forth.

2. The pair of cutters when constructed as described, with recessed ends, as and for the purposes recited.

This specification signed this 10th day of June, 1871.

WILLIAM HAWKINS.

Witnesses
 A. B. CLASON,
 J. H. BOONE.

(100)